March 20, 1951  F. P. FORSS  2,545,453
ROTARY PNEUMATIC TOOL
Filed Sept. 22, 1945  2 Sheets-Sheet 1
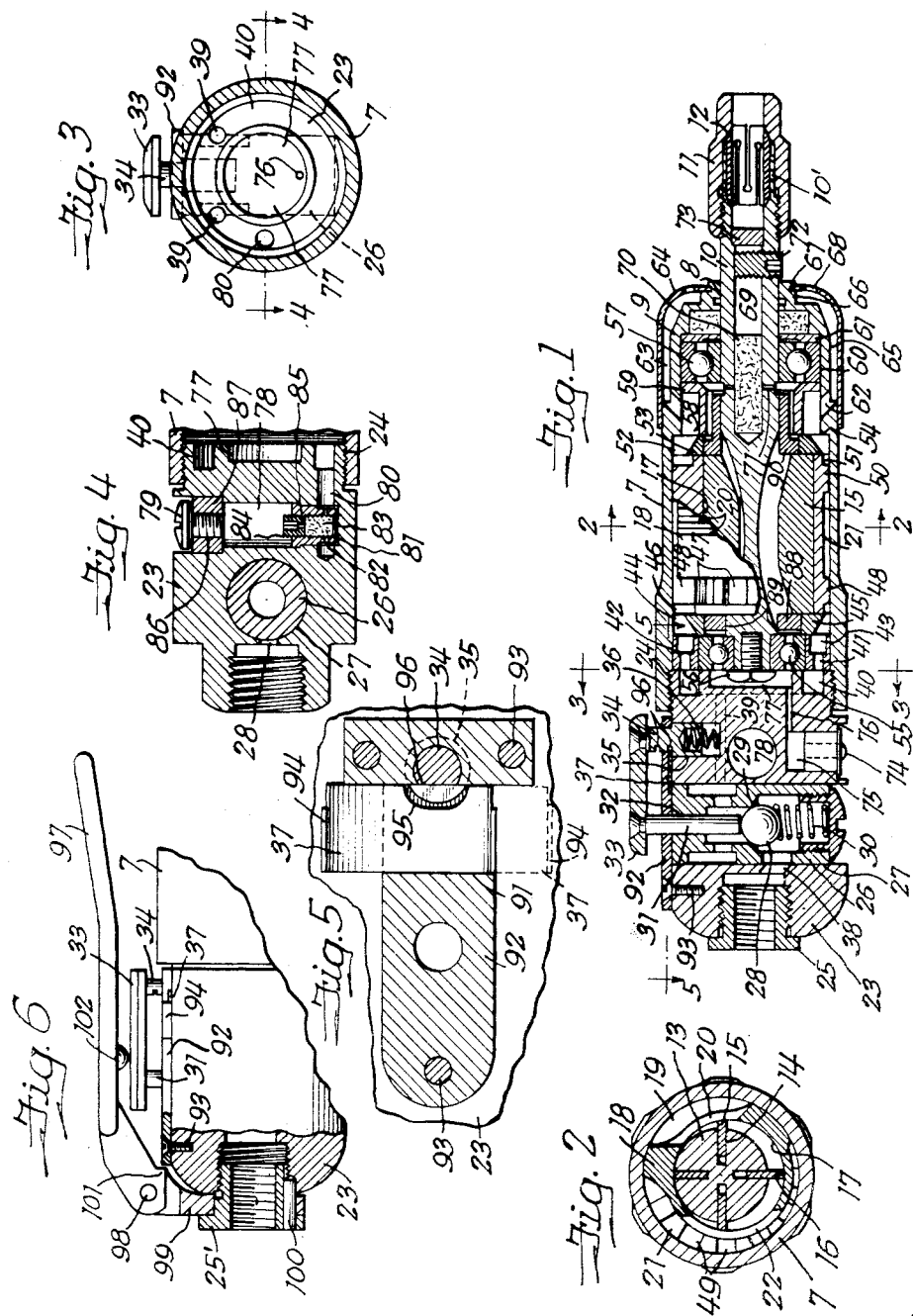
Inventor
Frithiof P. Forss

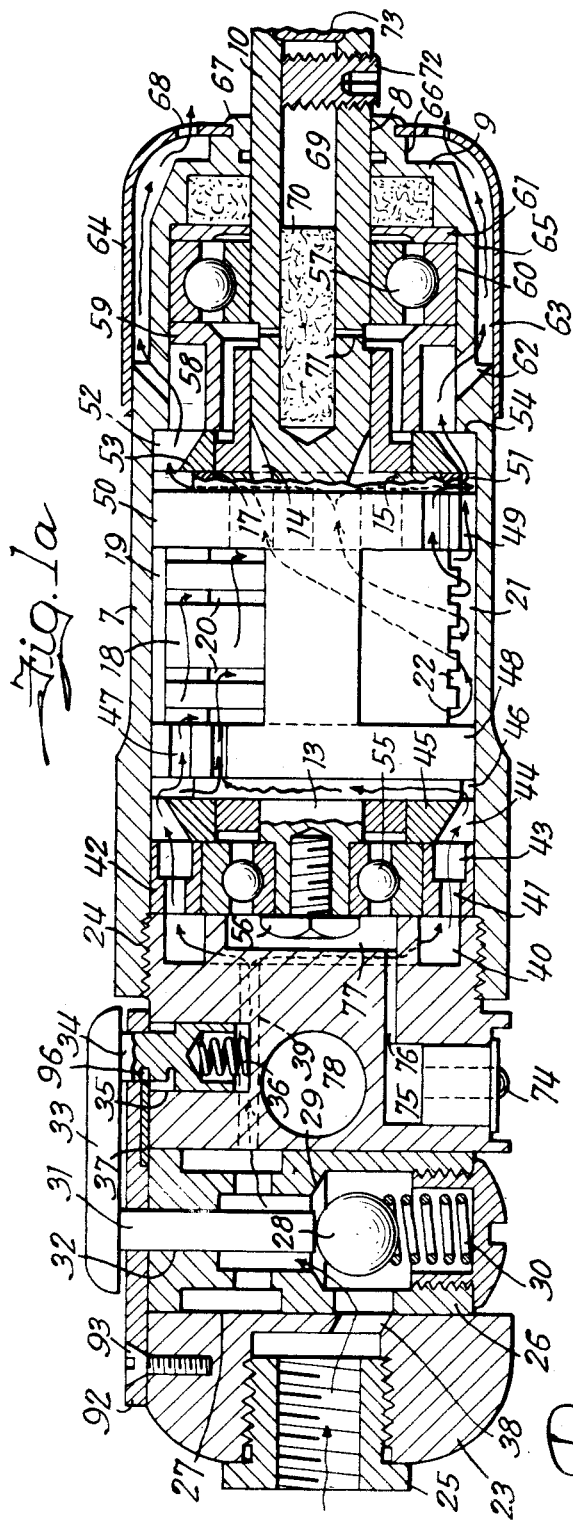
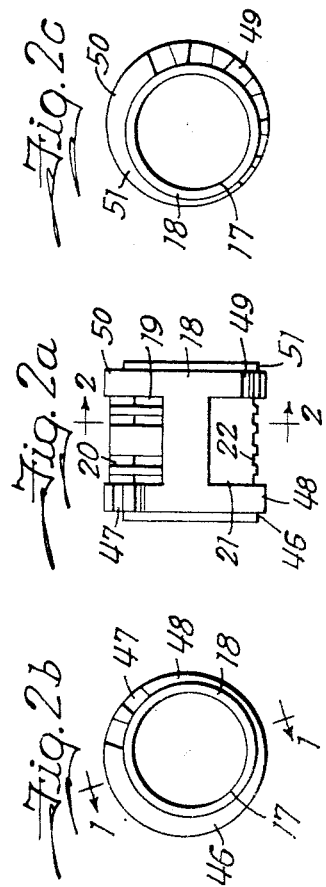

Patented Mar. 20, 1951

2,545,453

UNITED STATES PATENT OFFICE 2,545,453

ROTARY PNEUMATIC TOOL

Frithiof P. Forss, Rockford, Ill., assignor, by mesne assignments, to Skilsaw, Inc., Chicago, Ill., a corporation of Delaware Application September 22, 1945, Serial No. 618,047

14 Claims. (Cl. 121—34)

This invention relates to rotary pneumatic tools, and more particularly small light-weight high-speed hand tools for die grinding and rotary filing, the invention having for its general object the provision of a tool of this kind having a relatively smooth cylindrical housing of compact size, so that it can be held and manipulated with ease and comfort, and further so designed as to reduce or eliminate the more common objections and shortcomings of this type of tool.

One of the most objectionable features of rotary pneumatic tools has been the shrill exhaust noise. The tool of my invention incorporates a series of expansion chambers to receive the exhaust air, so that the air is exhausted in a substantially even flow, instead of the usual pulsating flow, thereby substantially reducing noise.

Another object of my invention is to utilize the air stream to cool off the bearings for the rotor, the incoming air being admitted to an annular chamber around the upper bearing and the exhausting air being admitted to another annular chamber or chambers around the lower bearing for uniform cooling of both bearings.

Still another object of my invention is to reduce air leakage and consequent loss of power to a minimum in a rotary pneumatic tool of the present type. Usually in such tools the ends of the cylinder are closed by end plates, the cylinder with the end plates clamped against its ends forming the space within which the rotor revolves. Such a construction necessitated small end clearance between the rotor and end plates for efficient operation, but even slight wear of the thrust bearings was sufficient to allow the rotor to rub against the end plates, causing further wear and considerable loss of power. That objection is avoided in my construction by forming the end plates in two ring sections concentric with one another, the outer ring section being fixed and clamped against the end of the cylinder and the inner ring section turning with the rotor, and, since the clearance between the two ring sections can be easily controlled and will not be affected by the rotor, very little air leakage can occur.

A further object is to simplify the assembly so that all of the inner parts may be assembled into the housing without regard to angular relationship, thus doing away with the necessity for keys and pins to insure proper alignment between parts.

Another object is to provide a tool of the kind mentioned having improved lubrication means, the lower bearing which supports the spindle having oil fed thereto by centrifugal force to insure adequate lubrication of this bearing which is subjected to such severe strains in the operation of the tool, due to the nature of the work and the unbalanced condition of tools attached to the spindle, and the upper bearing and cylinder being supplied with oil automatically in regulated amounts sufficient for the purpose between operations of the tool.

The invention is illustrated in the accompanying drawing, in which—

Fig. 1 is a longitudinal section through a rotary pneumatic tool made in accordance with my invention and shown actual size;

Fig. 1a is an enlarged view similar to Fig. 1 but showing the inlet valve open and indicating the air flow through the tool;

Figs. 2 and 3 are cross-sections taken on the lines 2—2 and 3—3 of Fig. 1, looking in the directions indicated by the arrows;

Fig. 2a is a side view of the motor cylinder removed from the housing and turned to a position showing both the intake and exhaust chambers, Fig. 2 being a cross-section on the line 2—2 of Fig. 2a and Fig. 1 being a longitudinal section on the line 1—1 of Fig. 2b;

Figs. 2b and 2c are views taken from opposite ends of the cylinder;

Fig. 4 is an enlarged sectional detail taken on the line 4—4 of Fig. 3;

Fig. 5 is an enlarged sectional detail taken on the line 5—5 of Fig. 1, and

Fig. 6 is a fragmentary view partly in side elevation and partly in longitudinal section, showing a modified or alternative construction.

Similar reference numerals are applied to corresponding parts throughout the views.

The present tool has been designed for use as a die grinder for finishing and similar work, and as a rotary file for cleaning aluminum castings, particularly between the cooling fins on airplane engines and other work of the same nature, and is well suited for metal pattern work, and also as a tool post grinder for internal grinding. The tool is, however, adaptable to various other uses, as will soon appear.

Referring mainly to Fig. 1, the reference numeral 7 designates the housing which has a center opening 8 in its end wall 9 through which the rotary spindle 10 projects. 11 is a chuck threaded on the end of the spindle and having a flexible sleeve collet 12 therein that is tapered at both ends to cooperate with tapered shoulders on the spindle and in the chuck body to clamp various sized shanks on grinding wheels, rotary files and other tools. The pilot extension 10' on the spindle 10 fitting in the bore of the chuck body 11 insures good alignment and prevents side play, and keeps the collet 12 centered properly so that it will be compressed radially uniformly from end to end when the chuck is tightened, for a better hold on the tool shank. The spindle 10 is formed as an integral axial extension of the rotor 13, which, as clearly appears in Fig. 2, is of cylindrical form and has radial slots 14 provided therein and extending lengthwise thereof parallel to the axis of rotation. Blades 15 of a suitable non-metallic composition material are slidably received in the slots 14 for sliding contact on their straight bevel edges 16 in the eccentric cylindrical bore 17 of the cylinder 18. The cylinder 18 is most clearly illustrated in Figs. 2a, 2b, and 2c, and appears in cross-section in Fig. 2 and in longitudinal section in Fig. 1. The cylinder 18 fits closely inside the housing 7 and is cut away on the outside between the ends thereof to define an air intake chamber 19 of approximately 90° angular extent which opens into the bore 17 through a plurality of slots 20, and an exhaust chamber 21 of about 180° angular extent which communicates with the other side of the cylinder 17 through slots 22. It should be clear from a study of Fig. 2 that if compressed air is admitted to the intake chamber 19, the rotor 13 will be turned in a clockwise direction and the air will be exhausted to the exhaust chamber 22. This type of rotary pneumatic motor, generally speaking, is, of course, well known.

Forming one end of the housing is a head 23 that is threaded into the open end of the housing 7, as indicated at 24, and has a nipple 25 threaded into the outer end thereof for connection of a flexible air hose to the tool for delivery of compressed air thereto. A valve bushing 26 has a press fit in a diametrically extending hole 27 in the head 23 and contains a stainless steel ball valve 28 which is normally held against a seat 29 in the bushing by means of a coiled compression spring 30. The valve 28 may be unseated by endwise movement of a pin 31 slidable with a close working fit in a center hole 32 provided in the end of the bushing 26, the pin being riveted or otherwise suitably secured to a trigger 33 which is disposed in parallel relation to the longitudinal axis of the tool and has a plunger 34 riveted or otherwise suitably secured to its other end and slidable in a radial bore 35 provided in the head 23. A spring 36 acting between the inner end of the bore 35 and the plunger 34 tends normally to hold the trigger 33 and pin 31 in the retracted or "off" position, and inasmuch as the pin 31 is subjected to end thrust by the spring 30 in the closing of the valve 28 it is clear that the joint action of the two springs 30 and 36 eliminates likelihood of any binding action in the operation of the trigger. The trigger can be locked in either extreme position, that is to say, in "on" or "off" position, by means of a latch slide 37, as hereinafter described. The air admitted through the nipple 25 flows through a passage 38 into the bushing 26 below the valve 28, and if the valve 28 is opened the air flows through the bushing and through two passages 39 in the head 23 into an annular groove 40 in the inner end of the head. The air flow is illustrated in Fig. 1a. The air flows from the annular groove 40 through a plurality of circumferentially spaced holes 41 in a bearing supporting ring 42 into an annular groove 43 in the other side of the ring, and thence through notches 44 in the periphery of a cylinder clamping ring 45 into an annular groove 46 in the end of the cylinder 18. Obviously, air flow from the annular groove 40 to the annular groove 43 and thence to the annular groove 46 does not necessitate any special angular registration between rings 42 and 45. From this groove 46 the air flows through notches 47 in an annular flange 48 on one end of the cylinder 18 into the air intake chamber 19, previously mentioned. The exhaust air from the exhaust chamber 21, previously mentioned, flows through notches 49 in another annular flange 50 on the other end of the cylinder into an annular groove 51 in the end of the cylinder on the other side of said flange. From this groove 51 the exhaust air flows through notches 52 in the periphery of another cylinder clamping ring 53 that has abutment with an annular shoulder 54 in the housing 7, the exhaust air being thereafter conducted out through the front end of the tool in the manner hereinafter described. Here again, it is obvious that the air flow from the annular groove 51 through notches 52 does not call for any special angular location of ring 53. Hence it should be evident what a simple matter it is to assemble this tool, because the various parts may be assembled into the housing 7 without regard to angular relationship, thus doing away with the necessity and expense of providing keys and keyways and locating pins to insure alignment of one part relative to another. The flanged cylinder 18 will cooperate properly with the rotor 13 in any position of rotation in the housing 7 and is assured of air supply in any position of rotary adjustment from the annular groove 46. In like manner, the exhausting of air is assured in any position of rotary adjustment of the cylinder from the annular groove 51 in the other end of the cylinder. The cylinder 18 is clamped between the rings 45 and 53 when the head 23 is tightened against the ring 42 which has abutment with the ring 45, as shown, the assembly of rings 42, 45 and 53, together with cylinder 18, being clamped between the shoulder 54 and the head 23 when the latter is tightened.

The air flowing through the holes 41 and annular groove 43 in the ring 42 serves to cool the ball bearing 55, the outer race of which is in intimate contact with the ring 42 and is clamped between the head 23 and ring 45, and the inner race of which is clamped to the inner end of the rotor 13 by the screw 56. The other ball bearing 57 for the spindle end 10 of the rotor 13 is likewise cooled by air flow around the same in the operation of the tool, the exhaust air flowing through the notches 52 being conducted into an annular groove 58 in a spacer ring 59 that fits in the reduced front end portion 60 of the bore of the housing 7 with the outer race of the bearing 57 and cooperates with a thrust ring 61 on the other side of the bearing 57 to clamp the outer race of said bearing in place when the head 23 is tightened, end thrust being transmitted to the ring 59 by the ring 53. The air flows from the annular groove 58 through a plurality of radially extending holes 62 in the wall of the housing 7 into an expansion chamber 63 provided inside a thin metal cap 64 that surrounds the front end portion 65 of the housing 7, the latter portion being of reduced diameter, as shown, so as to provide this expansion chamber 63 between these parts. The cap 64 has a press fit over the housing 7 and is fastened in place on the reduced neck portion 66 on the end of the housing by swedging the end of the neck portion over the end of the cap, as indicated at 67. A plurality of circumferentially spaced exhaust ports 68 in the end wall of the cap 64 directs the exhaust air forwardly toward the work to blow away the dust and chips to facilitate working with the tool. It should be clear that there is sufficient air flow around both of the ball bearings 55 and 57 to avoid overheating and keep the whole tool cool and comfortable to handle. The triple expansion of the exhaust air, first in flowing from the exhaust chamber 21 into the annular chamber 51, and secondly in flowing from the annular chamber 51 into the larger annular chamber 58, and finally in flowing from the annular chamber 58 into the still larger annular chamber 63, results in the smoothing out of the pulsations to a substantially even flow when the air is finally exhausted to the atmosphere through the small ports 68, so that there is only a small fraction of the exhaust noise that would otherwise be heard if the air were exhausted directly to the atmosphere from the exhaust chamber 21.

The spindle bearing 57 is subjected to the most severe strains due to the nature of the work and unbalanced condition of tools attached to the spindle, and it is, therefore, important to provide ample lubrication. For that reason, I prefer to have oil fed by centrifugal force to this bearing. An axial bore 69 is, therefore, provided in the spindle and half of its length is packed with hard felt, as indicated at 70, oil being fed by centrifugal force from the bore 69 through small radial holes 71 in the spindle, the felt serving to filter the oil and also restrict its flow to the desired extent. A screw plug 72 is threaded in a radial hole in the outer end portion of the spindle 10 and may be removed with a wrench once each day or so, depending, of course, on the amount of usage of the tool, to permit replenishing the oil supply in the bore 69. A metal plug 73 closes the outer end of the bore behind the collet 12.

The other bearing 55 for the rotor 13 does not require as much lubrication, and I have, therefore, provided for intermittent lubrication of this bearing and also for the bore 17 of the air motor, the lubrication of the bore occurring after each operation of the tool. A lubricator nipple 74 is inserted in a hole 75 in the side of the head 23, the inner end of which communicates through a passage 76 with a recess 77 in the center of the inner end of the head adjacent the bearing 55, whereby to permit the operator to lubricate the bearing 55 occasionally during the use of the tool whenever he thinks the bearing requires lubrication, judging from the amount of use the tool has had. A lubricant reservoir 78 is provided in a diametrically extending bore in the head 23 to which access may be had by removal of a screw plug 79 when the supply of lubricant in the reservoir requires replenishing. A passage 80 establishes communication between the inner end of the reservoir 78 and the annular groove 40, whereby to develop pressure in the reservoir 78 equal to the pressure in the groove 40 while the tool is being operated, and then when the tool is not in operation the pressure built up in the reservoir may be used to expel a predetermined amount of lubricant from the reservoir. The pressure in the reservoir 78 is built up slowly and is relieved slowly, due to the fact that the reservoir has only restricted communication with the passage 80, and in that way the lubrication is reduced to a few drops in each cycle. A hollow plug 81 has a press fit in the inner end of the hole providing the reservoir 78 and communicates with the passage 80 through a plurality of radially extending holes 82 provided in the end portion thereof. A wad 83 of felt is inserted in the plug 81 and may be compressed to any desired extent by the tightening of a screw plug 84 which threads in the plug 81. A small orifice 85 in the inner end of the plug 84, which may be referred to as a bleeder hole, affords restricted communication between the passage 80 and the reservoir 78, but the restriction is, of course, increased more and more, depending upon the extent to which the plug 84 is tightened and accordingly compresses the felt wad 83. The plug 84 may be adjusted by means of a wrench entered through the hole 86 in the plug 87 when the screw plug 79 is removed. With this automatic and intermittent lubrication of the bore 17 of the air motor, long life is insured for the motor and the operator does not have to bother about replenishing the oil in the reservoir 78 more than once a week or so, depending, of course, on the amount of usage of the tool.

In the conventional design of rotary motors of the type used in portable tools, the ends of the cylinder are usually closed by two end plates which, together with the bore in the cylinder against which the end plates are clamped, define the space in which the rotor is confined and revolves. Efficiency requires that the rotor have a clearance of as little as .004" to .006" relative to the two stationary end plates, but it is obvious that a very slight amount of wear of the thrust bearings will permit one end or the other of the rotor to rub against the end plates and cause wear and consequent loss of power. The present tool has been so constructed, in accordance with my invention, that the rotor 13 will not come into contact with the end plates, because the end plates are, so to speak, made in two ring sections concentric with one another, the inner ring section being pressed or secured by brazing or welding onto the rotor to form an integral part of it of the same diameter as the rotor, and the outer ring section being stationary and clamped against the end of the cylinder. In that way, the diameter of the rotor is the same as the diameter of the inner ring section of the end plates, and the clearance between the inner ring sections and the outer ring sections of the end plates can be easily controlled and, therefore, only very little air can escape. The cylinder clamping rings 45 and 53, previously described, constitute the outer ring sections of the end plates for the cylinder. The inner ring section for the one end plate is formed by a ring 88 which is concentric with the ring 45 and may have a press fit on the hub portion 89 provided on one end of the rotor 13, but is preferably brazed or welded in place. This ring 88 is of less thickness than the ring 45, so as not to rub on the outer race of the bearing 55, and its radius is slightly less than the internal radius of the ring 45, so as to provide working clearance. The inner ring section of the other end plate is formed by another ring 90 bearing the same radius relationship to the ring 53 as the ring 88 bears to the ring 45. The ring 90 may have a press fit on the inner end portion of the spindle portion 10 but is preferably brazed or welded in place and is slightly thinner than the ring 53, so as not to rub on the ring 59 in the turning of the rotor. With this construction, the objection referred to in earlier constructions, resulting in considerable loss of power, is avoided, and the air motor operates efficiently throughout the life of the tool.

Referring to Fig. 5, I have provided a simple and reliable safety lock for the trigger 33 which permits locking the trigger either in the "on" or "off" position. This structure forms the subject matter of a divisional application, Serial No. 700,664, filed October 2, 1946. When the trigger is locked in the "off" position, the motor cannot be started accidentally by being laid down or in the handling of the tool while removing a grinding wheel or other tool from the spindle. The latch slide 37, mentioned previously is made of flat spring steel arched on a smaller radius than the radius of the head 23, so that when it is cramped in the guide 91 provided therefor in the plate 92, sufficient frictional resistance is assured by its contact at both ends on the head and between the ends on the plate 92 to eliminate likelihood of the slide being moved endwise accidentally. The plate 92 is fastened by three screws 93 onto a flat face provided on one side of the head 23. The plate 92 serves also to retain the plunger 34 by engagement with the enlarged lower end portion that operates in the hole 35. The slide 37 has bent-up end portions 94 which are easily accessible to the operator on opposite sides of the trigger 33, as thumb pieces, to move the slide in either direction to lock or unlock the trigger. A notch 95 is provided in the slide 37, and in the unlocked position of the slide permits free movement of the plunger 34 up and down relative to the slide 37. However, there are two slots 96 cut into one side of the reduced upper end portion of the plunger 34, as clearly appears in Fig. 1, and when the slide 37 is moved endwise from the unlocked position, shown in full lines in Fig. 5, to the locked position, indicated in dotted lines in the same figure, it will engage in whichever slot 96 is in coplanar relation to the slide. Hence, the plunger 34 may be locked in either its normal retracted position, shown in Fig. 1, which corresponds to the "off" position for the valve 28, or in its depressed position, which corresponds to the "on" or open position of the valve 28.

The trigger 33 is ordinarily depressed with two fingers of the hand grasping the tool, but some operators may prefer to operate the trigger with four fingers while grasping the tool, and for that reason I have shown, in Fig. 6, a lever 97 that is pivoted at 98 on a ring 99 arranged to be clamped onto the end of the tool by means of a nipple 25' and positively locked against rotation by means of a pin 100 driven into aligned holes in the nipple 25', ring 99, and head 23. The lever 97 has a shoulder 101 on its pivoted end portion which comes into engagement with the end of the plate 92 to limit outward swinging movement of the lever and keep it in close proximity with the trigger 33. A small rounded projection 102 on the inner side of the lever 97 is arranged to ride on the trigger 33 to depress the trigger when pressure is applied on the lever 97 by the closing of the fingers of the hand grasping the tool.

It is believed the foregoing description conveys a good understanding of the objects and advantages of my invention. The appended claims have been drawn to cover all legitimate modifications and adaptations.

I claim:

1. In a pneumatic device, a housing having a smooth cylindrical bore provided therein, a pneumatic motor cylinder element of generally cylindrical form fitting closely and adapted to be clamped in any position of rotary adjustment in said bore and having an eccentric cylindrical bore therein, a rotor mounted in said housing in concentric relation thereto and extending through said eccentric bore and having radial guide slots provided therein, and blades slidable in the guide slots and slidable peripherally in said eccentric bore, said cylinder element having recesses provided in the periphery thereof defining air intake and exhaust chambers in circumferentially spaced relation on said cylinder element within said housing, said chamber being defined between annular flanges on the ends of said element that are in close contact peripherally in the bore in said housing, end closures for said cylinder element fitting closely and adapted to be clamped in any position of rotary adjustment in said housing bore and having air conducting openings provided therein, said cylinder element being further formed peripherally on the outer sides of said flanges to define annular chambers at opposite ends of said cylinder element between said end closures and said flanges, said flanges having air conducting openings whereby one of said annular chambers communicates with the aforesaid peripheral intake chamber and the other with the aforesaid peripheral exhaust chamber, closure means for said housing clamping said cylinder element in fixed relation between said end closures in said housing, and means communicating with said annular chambers through the air conducting openings in said end closures for delivering and exhausting air to drive the rotor.

2. A pneumatic device as set forth in claim 1, including a bearing supporting ring for a rotor bearing disposed between the closure means for said housing and one of said end closures and arranged to be clamped in fixed relation to the rest of the assembly when the cylinder element is clamped, said ring also fitting closely and adapted to be clamped in any position of rotary adjustment in the housing bore, and means defining an annular chamber between said ring and the adjacent end closure communicating with the air openings in said end closure, said ring having air openings provided therein communicating with said annular chamber for conducting air therethrough in the operation of said device.

3. A pneumatic device as set forth in claim 1, including a bearing clamping ring for a rotor bearing disposed between the bearing and the adjacent one of said end closures and arranged to be clamped in fixed relation to the rest of the assembly when the cylinder element is clamped, said ring also fitting closely and adapted to be clamped in any position of rotary adjustment in the housing bore, and means defining an annular chamber between said ring and end closure communicating with the air openings in said end closure, said chamber conducting air therethrough in the operation of said device.

4. As an article of manufacture, a cylinder element for a pressure fluid motor insertable in a bore in a housing, the cylinder element comprising a tubular body of generally cylindrical form having a through bore in eccentric relation thereto and annular external flanges spaced inwardly from opposite ends to define projecting tubular portions on said body of smaller diameter than the flanges that are concentric to said bore, said flanges being connected by two circumferentially spaced longitudinally extending boss portions flush externally with the peripheries of said flanges defining an intake recess and an exhaust recess respectively between said flanges and bosses externally of said body, said body having through slots provided therein in the tubular wall thereof on diametrically opposite sides thereof communicating with the recesses, and one of said flanges having one or more openings provided therethrough externally of the body communicating with the intake recess, and the other of said flanges having one or more openings provided therethrough externally of the body communicating with the exhaust recess.

5. In a pneumatic motor, comprising a housing, an air cylinder therein having intake and exhaust openings, and a rotor turnable in said cylinder and having vanes slidable in the cylinder, means for supplying compressed air to said cylinder including an air passage in the housing communicating with the intake opening, a lubricant reservoir chamber in said housing also communicating with said intake opening whereby pressure is developed therein upon operation of said motor by compressed air, and means for restricting the flow of oil from said chamber under pressure upon stoppage of said motor comprising a wad chamber open at one end to said intake opening, a wad of compressible filter material in said wad chamber, and an adjustable screw threaded plug threaded in the other end of said chamber for compression of said wad to a variable extent and having a bleeder hole therein through which communication is established for said wad chamber with the reservoir chamber for restricted air and oil passage therebetween.

6. A structure as set forth in claim 5, including a filler opening for said reservoir chamber located so as to permit adjustment of said screw plug from outside said tool through said filler opening, and a closure for said opening.

7. In a pneumatic device, a housing having a smooth cylindrical bore provided therein, a pneumatic motor cylinder element of generally cylindrical form fitting closely and adapted to be clamped in any position of rotary adjustment in said bore and having an eccentric cylindrical bore therein, a rotor mounted in said housing in concentric relation thereto and extending through said eccentric bore and having radial guide slots provided therein, and blades slidable in the guide slots and slidable peripherally in said eccentric bore, said cylinder element having recesses provided in the periphery thereof defining air intake and exhaust chambers in circumferentially spaced relation on said cylinder element within said housing, said chambers being defined between annular flanges on the ends of said element that are in close contact peripherally in the bore in said housing, radially inner end closures for said cylindrical element secured on and turning with the rotor, radially outer end closures for said cylinder element, in which the last mentioned end closures have a close running fit, fitting closely in said housing bore and adapted to be clamped in any position of rotary adjustment and having air conducting openings extending therethrough, said cylinder element being further formed peripherally to define on the outer sides of said flanges annular chambers at opposite ends thereof, said flanges having air conducting openings extending therethrough through which one of said annular chambers communicates with the aforesaid peripheral intake chamber and the other with the aforesaid peripheral exhaust chamber, closure means for said housing arranged to clamp the cylinder element between said radially outer end closures in said housing, and means communicating with said annular chambers through the air conducting openings in said radially outer end closures for delivering and exhausting air to drive the rotor.

8. In a pneumatic motor, a housing having a smooth cylindrical bore provided therein, a pneumatic motor cylinder fitting closely in said bore and adapted to be clamped in any position of rotary adjustment and having an eccentric cylindrical bore therein, a rotor mounted in said housing in coaxial relation thereto and extending into said eccentric bore and carrying vanes operable in said bore, a spindle driven by said rotor, a radially outer ring concentric with and fitting closely in the housing bore and engaging the end of said cylinder and adapted for frictionally clamping said cylinder in place in said housing while partially closing the end of the eccentric bore therein, a radially inner ring fixed on the rotor and having a close running fit in the radially outer ring to complete the closing up of the end of the eccentric bore, means for clamping said cylinder by means of said radially outer ring, means for conducting compressed air to said eccentric bore and exhausting air therefrom, a bearing supporting ring for a rotor bearing disposed at one end of said rotor, said ring being arranged to be clamped with the radially outer ring when the cylinder is clamped, said ring also fitting closely in the housing bore and adapted to be clamped in any position of rotary adjustment, and means defining an annular chamber between said bearing supporting ring and the radially outer ring, both of said rings having air conducting openings provided therein communicating with said annular chamber, the air conducting openings in said bearing supporting ring communicating with the means for conducting compressed air to and from said eccentric bore, and the air conducting openings in the radially outer ring having communication with said eccentric bore in any position of rotary adjustment of said cylinder.

9. In a pneumatic motor, a housing having a smooth cylindrical bore provided therein, a pneumatic motor cylinder fitting closely in said bore and adapted to be clamped in any position of rotary adjustment and having an eccentric cylindrical bore therein, a rotor mounted in said housing in coaxial relation thereto and extending into said eccentric bore and carrying vanes operable in said bore, a spindle driven by said rotor, a radially outer ring concentric with and fitting closely in the housing bore and engaging the end of said cylinder and adapted for frictionally clamping said cylinder in place in said housing while partially closing the end of the eccentric bore therein, a radially inner ring fixed on the rotor and having a close running fit in the radially outer ring to complete the closing up of the end of the eccentric bore, means for clamping said cylinder by means of said radially outer ring, means for conducting compressed air to said eccentric bore and exhausting air therefrom, a bearing clamping ring for a rotor bearing disposed at one end of said rotor, said clamping ring being arranged to be clamped with the radially outer ring when the cylinder is clamped, said clamping ring also fitting closely in the housing bore and adapted to be clamped in any position of rotary adjustment, and means defining an annular chamber between said bearing clamping ring and the radially outer ring, the radially outer ring having air conducting openings provided therein communicating with said annular chamber, the annular chamber communicating with the means for conducting compressed air to and from said eccentric bore, and the air conducting openings in the radially outer ring having communication with said eccentric bore in any position of rotary adjustment of said cylinder.

10. In a pneumatic device, a housing having a smooth cylindrical bore provided therein, a pneumatic motor cylinder element of generally cylindrical form fitting closely and adapted to be fastened in any position of rotary adjustment in said bore and having an eccentric cylindrical bore therein, a rotor mounted in said housing in concentric relation thereto and extending through said eccentric bore and having radial guide slots provided therein, blades slidable in the guide slots and slidable peripherally in said eccentric bore, said cylinder element having recesses provided in the periphery thereof defining air intake and exhaust chambers in circumferentially spaced relation on said cylinder element within said housing, said chambers being defined between annular flanges on the ends of said element that are in close contact peripherally in the bore in said housing, end closures for said cylinder element fitting closely and adapted to be fastened in any position of rotary adjustment in said housing bore and having air conducting openings provided therein, said end closures being so formed on their inner sides facing the flanges on the cylinder element, and said cylinder element being so formed on the outer side of said flanges to define annular chambers at opposite ends of said cylinder element between said end closures and said flanges, said flanges having air conducting openings whereby one of said annular chambers communicates with the aforesaid peripheral intake chamber and the other with the aforesaid peripheral exhaust chamber, closure means for said housing fastening said cylinder element and end closures in said housing, and means communicating with said annular chambers through the air conducting openings in said end closures for delivering and exhausting air to drive the rotor.

11. In a pneumatic device, a housing having a smooth cylindrical bore provided therein, a pneumatic motor cylinder element of generally cylindrical form fitting closely and adapted to be fastened in any position of rotary adjustment in said bore and having an eccentric cylindrical bore therein, a rotor mounted in said housing in concentric relation thereto and extending through said eccentric bore and having radial guide slots provided therein, blades slidable in the guide slots and slidable peripherally in said eccentric bore, said cylinder element having recesses provided in the periphery thereof defining air intake and exhaust chambers in circumferentially spaced relation on said cylinder element within said housing, said chambers being defined between annular flanges on the ends of said element that are in close contact peripherally in the bore in said housing, radially inner end closures for said cylindrical element secured on and turning with the rotor, radially outer end closures for said cylinder element, in which the last mentioned end closures have a close running fit, fitting closely in said housing bore and adapted to be fastened in any position of rotary adjustment and having air conducting openings extending therethrough, said radially outer end closures being so formed on their inner sides facing the flanges on the cylinder element and said cylinder element being formed on the outer sides of said flanges to define annular chambers at opposite ends of said cylinder element between said radially outer end closures and said flanges, said flanges having air conducting openings extending therethrough through which one of said annular chambers communicates with the aforesaid peripheral intake chamber and the other with the aforesaid peripheral exhaust chamber, closure means for said housing fastening the cylinder element and radially outer end closures in said housing, and means communicating with said annular chambers through the air conducting openings in said radially outer end closures for delivering and exhausting air to drive the rotor.

12. In a pneumatic tool lubricator, the combination of a lubricant reservoir chamber in open communication with the interior of said tool for delivery of lubricant thereto and so as to have air pressure built up therein upon operation of said tool by compressed air, and means for restricting the flow of oil from said chamber under pressure upon stoppage of said tool, comprising a wad chamber open at one end to the interior of said tool, a wad of compressible filter material in said wad chamber and an adjustable screw-threaded plug threaded in the other end of said chamber for compression of said wad to a variable extent, and having a bleeder hole therein through which communication is established for said wad chamber with the reservoir chamber for restricted air and oil passage therebetween.

13. A structure as set forth in claim 12, including a filler opening for said reservoir chamber located so as to permit adjustment of said screw plug from outside said tool through said filler opening, and a closure for said opening.

14. As an article of manufacture, a cylinder element for a pressure fluid motor insertible in a bore in a housing, the cylinder element comprising a tubular body of generally cylindrical form having a through-bore in eccentric relation thereto and annular external flanges on opposite ends, said flanges being connected by two circumferentially spaced longitudinally extending boss portions flush externally with the peripheries of said flanges defining an intake recess and an exhaust recess respectively between said flanges and bosses externally of said body, said body having through-slots provided in the tubular wall thereof on diametrically opposite sides thereof communicating with the recesses, and one of said flanges having one or more openings provided therethrough externally of the body communicating with the intake recess, and the other of said flanges having one or more openings provided therethrough externally of the body communicating with the exhaust recess.

FRITHIOF P. FORSS.

REFERENCES CITED

The following references are of record in the file of this patent:

UNITED STATES PATENTS

| Number | Name | Date |
|---|---|---|
| 442,230 | Libby | Dec. 9, 1890 |
| 994,401 | Holt et al. | June 6, 1911 |
| 1,009,668 | Jass | Nov. 21, 1911 |
| 1,048,453 | Holt | Dec. 24, 1912 |
| 1,503,508 | Kraber | Aug. 5, 1924 |
| 1,727,718 | Kinsey | Sept. 10, 1929 |
| 1,735,176 | Moore et al. | Nov. 12, 1929 |
| 1,758,760 | Price et al. | May 13, 1930 |
| 1,861,706 | McCracken | June 7, 1932 |
| 1,931,167 | Price et al. | Oct. 17, 1933 |
| 1,940,024 | Shaff | Dec. 19, 1933 |
| 1,942,784 | Terrill | Jan. 9, 1934 |
| 1,956,644 | Hamerly | May 1, 1934 |
| 1,999,369 | Norling | Apr. 30, 1935 |
| 2,099,280 | Shaff | Nov. 16, 1937 |
| 2,357,385 | De Paepe | Sept. 5, 1944 |
| 2,373,665 | Emery | Apr. 17, 1945 |
| 2,373,668 | Emery | Apr. 17, 1945 |
| 2,373,669 | Sturrock | Apr. 17, 1945 |
| 2,384,872 | Baker et al. | Sept. 18, 1945 |